May 10, 1927.

W. KONING 1,628,410

EXHAUSTING MACHINE

Filed Feb. 12, 1924

Inventor:
Willem Koning,
by *His Attorney.*

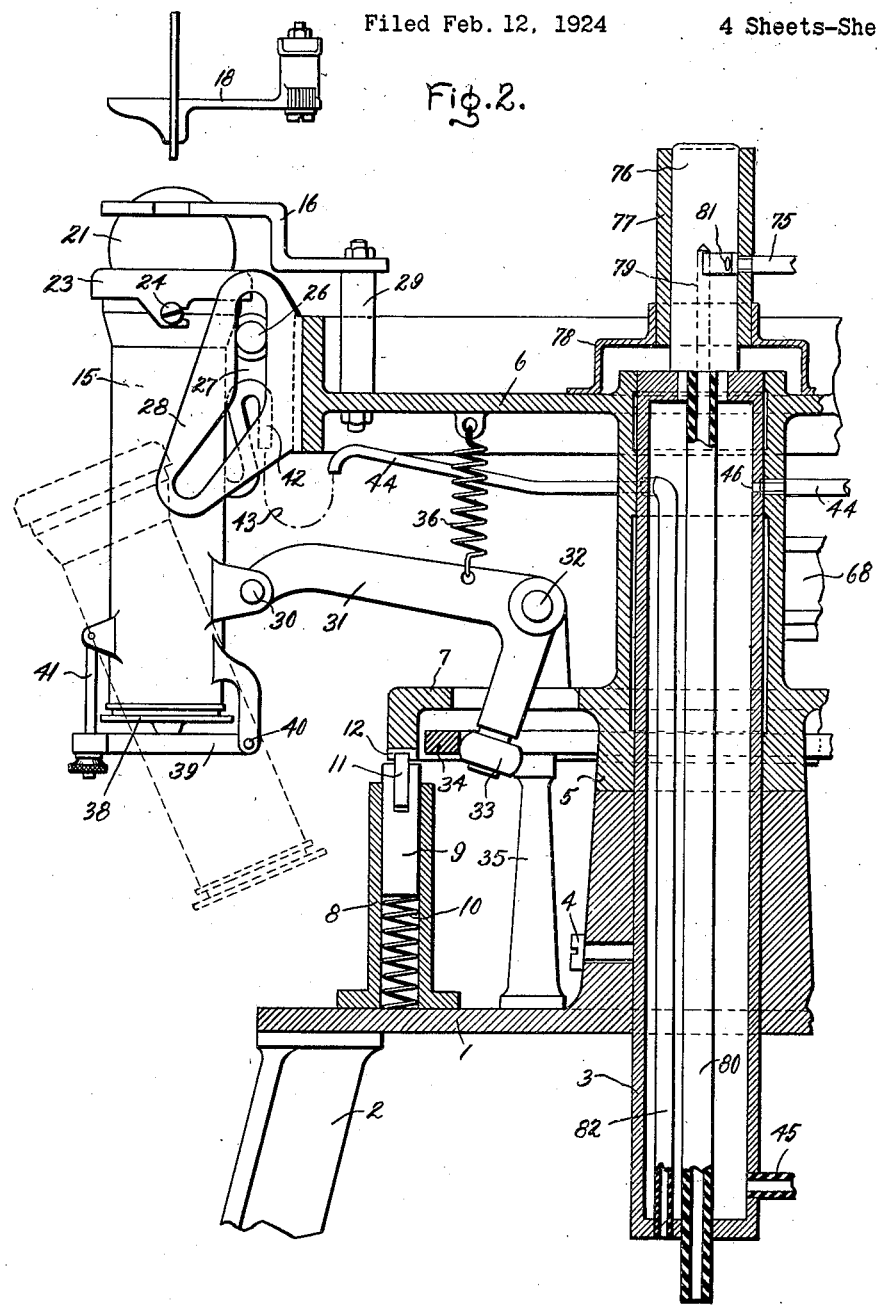

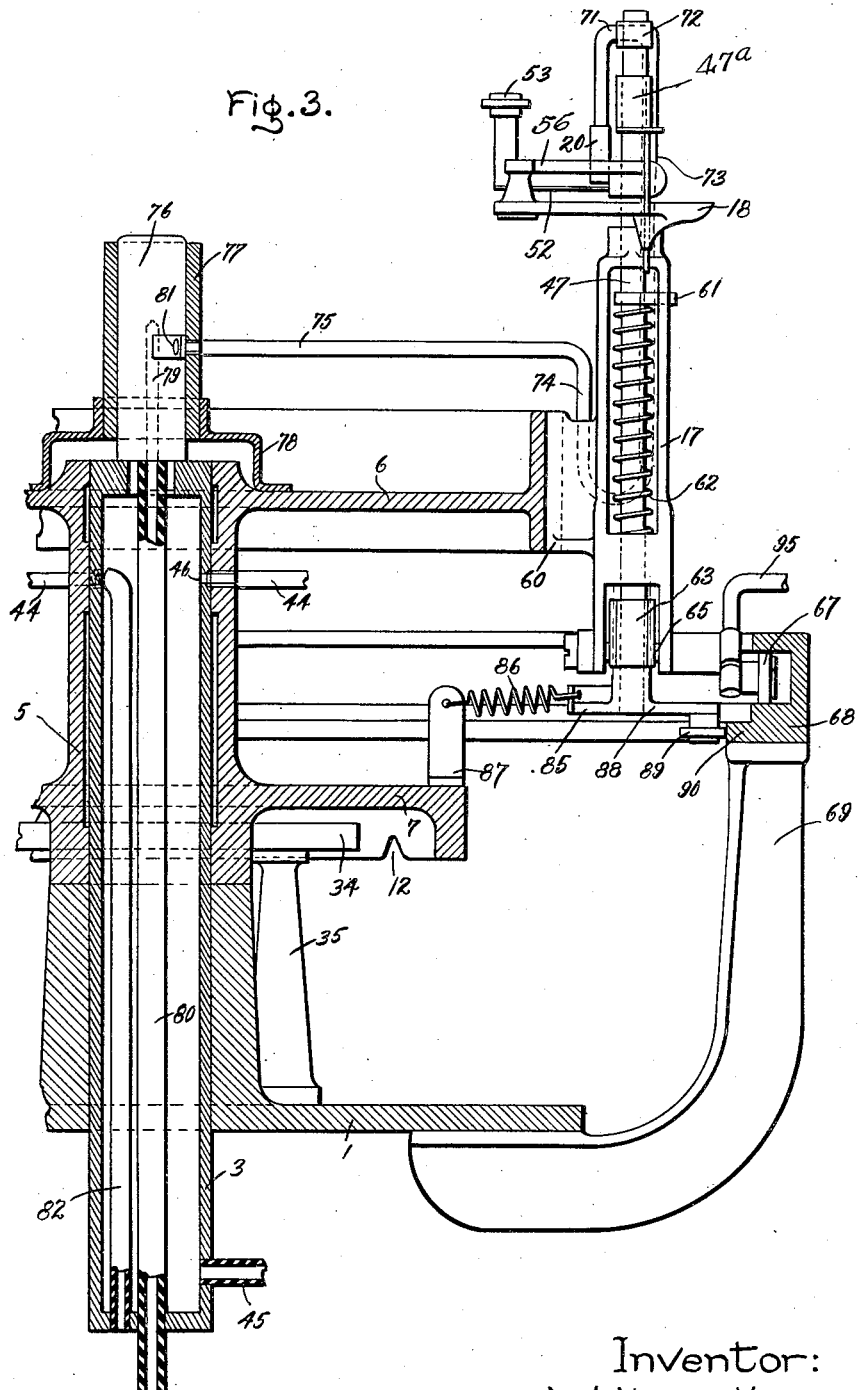

May 10, 1927.  
W. KONING  
1,628,410  
EXHAUSTING MACHINE  
Filed Feb. 12, 1924   4 Sheets-Sheet 4
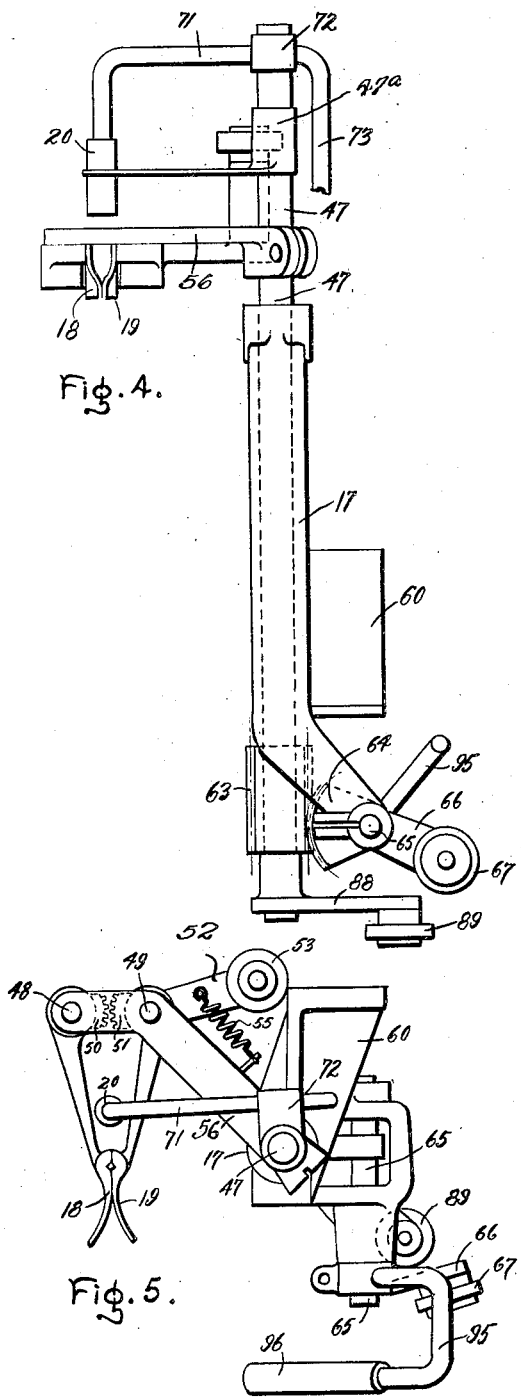
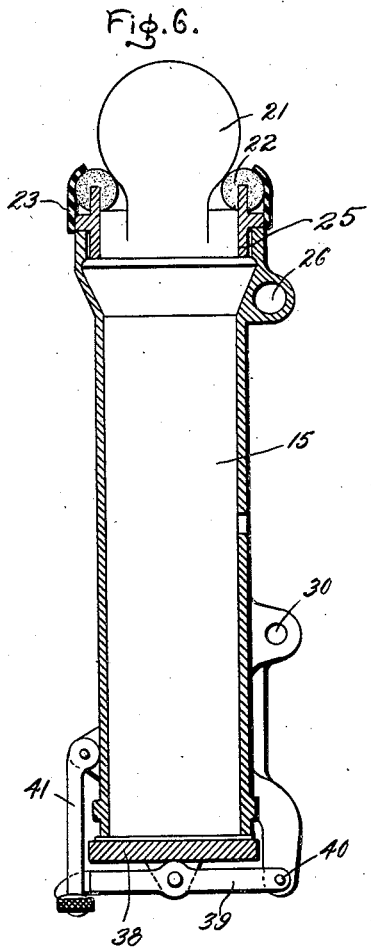
Inventor:  
Willem Koning,  
by *[signature]*  
His Attorney.

Patented May 10, 1927.

1,623,410

UNITED STATES PATENT OFFICE.

WILLEM KONING, OF EINDHOVEN, NETHERLANDS, ASSIGNOR TO GENERAL ELECTRIC COMPANY, A CORPORATION OF NEW YORK.

EXHAUSTING MACHINE.

Application filed February 12, 1924, Serial No. 692,393, and in the Netherlands March 17, 1923.

This invention relates to a machine for affixing glass tubes to glass bulbs, and more particularly for affixing tubules to glass vessels which are to be exhausted, for example, to bulbs for electric lamps. It will be obvious, however, that the machine is generally applicable to affixing glass tubes to hollow glass bodies of any shape.

The name "tubule" is given to the glass tube of small diameter that serves for connecting the bulb to the vacuum conduit. As a rule the tubule is joined to the centre of the large end of the bulb which is called "the bottom."

In order to affix the tube a small hole is generally made in the bulb at the point where the tube will be affixed, said hole connecting the interior of the bulb with the tube. The latter is fused at one end to the glass wall of the hole. For that purpose the bulb and the tube are softened at the desired points, whereupon the tube is often contracted to a very small diameter close to the bulb.

The machine according to the invention comprises a rotary frame, a number of bulb-holders and an equal number of holders for the glass tubes, said holders being carried by the frame. In addition the machine is provided with a number of devices for making a hole in the bulb at the point where the glass tube is to be joined and a number of devices for the operation of fusing the glass tube to the bulb at the said point. The various operations to which the bulbs and the glass tubes are to be subjected are carried on simultaneously in various positions of the rotary frame.

The burners used in making a hole in the bulbs are preferably carried by the rotary frame. In this way it is easier to bring the burners into proper relation to the point to be heated than in the case of stationary burners and bulb holders which are moving from one position to the next. The machine may be so arranged that while the frame rotates the tube holders and the said burners are successively brought into operative relation to the bulb. According to a practical embodiment of the machine a rotary table is used, which can be locked in a number of positions. The said table is provided with an equal number of bulb holders by which the bulbs are carried and centered in a vertical position, and with an equal number of vertically reciprocatable holders for the glass tubes, which are so arranged that the glass tubes are held in a vertical position directly above the centre of the body of the bulbs or in a position at some distance therefrom. The burners for heating the zone on the bulb where the hole is to be made, are preferably so adjusted that they direct a vertical flame on the centre of the bottom of the bulb. The tube holders as well as the burners may be fastened to a vertical shaft which is vertically reciprocatable in the rotary table and as the latter is turned automatically so rotated that the holders and the burners are successively moved into and out of operative relation to the bulbs.

As the tube holders and burners in operative position are placed above the bulb, the inserting of the bulb into the bulb carriers will be rendered difficult by said members unless the bulb carriers can be moved out of operative position. Preferably the bulb carriers are automatically moved sideways and downward out of range of the tube holders. To that end the bulb carriers may be provided with one or more pins which are slidable in guideways firmly attached to the rotary table.

It is advisable to arrange the machine in such a way that the holders for the glass tubes are automatically opened when the bulb carriers are moved out of operative position, as otherwise the glass tube might break.

In order to make the hole in the glass body, air under pressure may be made use of in the machine according to the invention. It may be delivered to the bulb holders through conduits which are connected to a central standard forming part of the rotary frame and pivoting around a hollow shaft. The pressure of air in the hollow shaft is always above atmospheric pressure so that at the desired moments air under pressure can be forced from the hollow central shaft to the bulb carriers.

Fusing the glass tube to the bulb may cause a pressure above atmospheric in the bulb, which is detrimental to the fusing operation and therefore the bulb carriers are preferably connected to an outlet.

The burners for heating the zone of the bulbs to which the glass tube will be joined may be connected to the said central standard likewise through gas pipes. The standard is rotatable about a central shaft so that at the moments desired gas can be admitted to the burners from the central shaft.

In the accompanying drawings which illustrate a machine according to one embodiment of the invention.

Figure 2 is a vertical section through position G of Figure 1.

Figure 3 is a vertical section along the line *a—b* of Figure 1.

Figure 4 is a front view and

Figure 1:
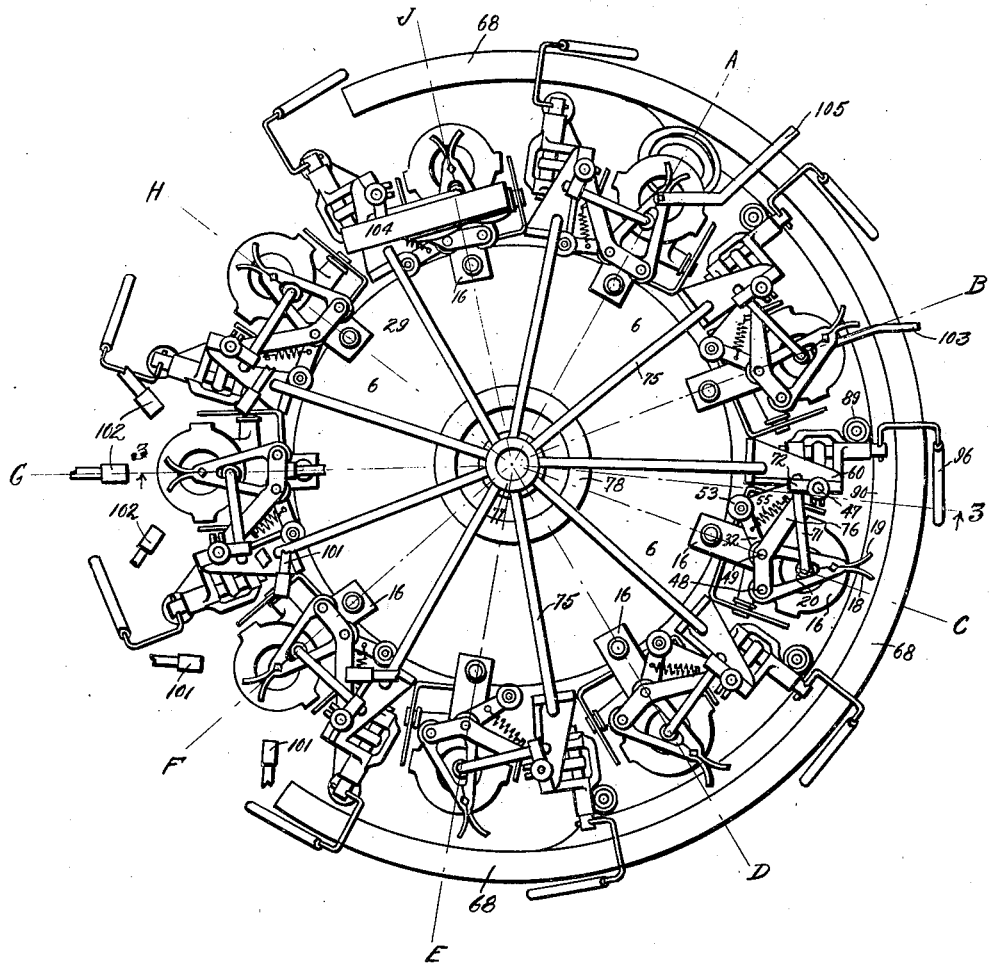
Figure 1 is a plan of the machine.

Figure 5 a plan of the mechanism for actuating the tubule and a burner, whereas

Figure 6 is a vertical section through one of the bulb holders.

The machine shown has nine positions, in which the successive operations are carried on. The number of positions depends for example on the speed of operation and can be varied according to circumstances.

In Figure 1 the various positions in succession are indicated by the letters A, B, C, D, E, F, G, H, J.

The machine is provided with the same number of sets of carriers for the bulb and the tubule as there are different positions. Each set of carriers comprises a bulb holder 15, a burner 20 and two jaws 18 and 19 for holding the tubule.

In the various positions the following operations are carried on in succession:—

In position A, a finished bulb is discharged. A fresh bulb is inserted in the bulb carrier and the tubule is placed between the jaws 18 and 19. Then the bulb carrier is moved into the next position. In the machine shown this movement takes place in a clockwise direction. It will be obvious that although the machine shown in the drawing is rotated by hand it may be quite as well turned mechanically in some known manner so that the machine is automatically moved into the various positions in succession and in each position remains stationary for a certain length of time.

In position B the burner 20 is above the bulb and directs a pointed flame upon the centre of the bottom of the bulb. In positions C, D and E the burner remains in the same position relatively to the bulb and the said zone of the bulb is further heated, a hole being blown in the centre of the bottom by forcing air under pressure into the inside of the bulb in one of the positions before-mentioned. In position F the burner 20 has left the centre-line of the bulb and has been replaced by the tubule which has been brought into position by the jaws 18 and 19. The lower part of the tube is then heated by burners 101. In position G the lower part of the tube and the zone of the bulb to which it is to be fused are heated by burners 102. When these parts are plastic the tube and the bulb are brought into contact by operating a handle 96 and thus are fused together, whereupon the tube is raised a little so that it is contracted close to the bulb. This contraction tends to facilitate the subsequent fusing off of the tubule and to give the desired shape to the point of the bulb. In positions H and J the bulb and the tube which are fused together can cool down and when the machine is moving from position J to position A the grip of the jaws 18 and 19 is automatically released whilst at the same time the bulb carrier is moving downward so that in position A the bulb with tube can easily be taken out of the bulb carrier. The burners 101 and 102 which do not follow the movement of the machine are secured to the stationary part of the machine. For the sake of clearness this attachment is not shown in the drawings.

The burners are fed with a mixture of gas and air, the supply of which can be effected in known manner.

The various parts of the machine will now be fully described.

The machine comprises a table 1 (Figures 2 and 3) which by means of legs 2 is mounted on the floor. An upright hollow post 3 is fastened to the table 1 by means of a bolt 4. Around the top of the post 3 a frame 5 which may consist for example of cast-iron is rotatably mounted. This frame rests on the projecting part of the table 1. The frame 5 is at the top provided with a table 6 and at the bottom with a table 7 having a downwardly projecting rim. In the said rim a certain number of slots 12 are provided for locking the rotatable frame 5 in the various positions. To this end a resilient pin 11 (Figure 2) can enter into these slots. The pin 11 is fixed in the top of a vertical block 9, which is vertically reciprocatable in a housing 8 mounted on the table 1. The block 9 and consequently the pin 11 are pressed upward by a spring 10. It will be obvious that during the rotation of the frame 5 the pin will enter the slot 12 at intervals and the machine will be locked thereby in the various positions in succession.

The carrier for holding a bulb comprises a hollow body 15 (Figure 6) to the interior of which air under pressure can be admitted in a manner which will be described hereinafter. The bulb 21 rests when placed in the carrier, on a bushing 22 of rubber or other soft material and is normally clamped between said bushing and a guide 16 (Figure 2), which is fastened to the table 6 by a bolt 29. The bushing 22 is protected at the outside by a cap 23 (Figure 6) and is locked by a set screw 24 on the rim of a cylindrical member 25, which is screwed into the upper part of the body 15. A pin 26, which is slidable in guide-ways 27 (Figure 2) of two supports 28 is rigidly fixed to the body 15. The bulb carrier 15 is normally held in the position shown in Figure 2 by a spring 36 which holds up a bell-crank 31. The latter is rotatable about a pivot 32ᵃ which is rigidly fixed to the table 7. One lever of the bell-crank is connected to a lug 30 firmly fixed to the bulb carrier 15, and the other lever is provided with a roller 33 which during the rotation of the machine rolls upon a cam track 34. The latter is stationary and is mounted on the table 1 of the machine by means of columns 35. When the machine is moving from position J to position A the bulb carrier is moved into the position which is shown in dotted lines in Figure 2. For that purpose the track 34 is so shaped at this point that the roller 33 is forced radially towards the centre of the machine, the spring 36 being thus extended and the pin 26 of the bulb carrier being forced to move downward in the guide ways 27. At the same moment at which the bulb carrier moves downward along with the finished bulb the grip of the jaws 18 and 19 is released so as to prevent the tubule from breaking. The manner in which this movement is brought about will be described hereinafter.

In order to blow a hole in the bottom of the bulb it is necessary that air under pressure should be forced into the interior of the bulb carrier 15. Care should also be taken that the bulb carrier is hermetically sealed. This hermetical seal is obtained on the upper end by pressing the bulb 21 against the rubber bushing 22 through the cooperation of the guide 16 and the spring 36. The lower end of the bulb carrier is closed by a bottom plate 38, which can be opened by means of hinged levers 39 rotating on a pivot 40. By means of a set screw 41 the said plate can be firmly clamped against the lower end of the body 15. It is advisable that a bushing of rubber or of similar material should be provided between the plate 38 and the body 15. The plate 38 serves to facilitate the removal of glass fragments which might have fallen into the carrier. The air under pressure is supplied through a jet 42 (Figure 2) which, by means of a flexible rubber tube 43 or the like is in connection with a jet 44. It will be clear that the number of jets 44 corresponds to the number of positions through which the machine is moved. To these jets air under pressure is supplied at the proper moment from the hollow post 3. To that end the interior of this post is in connection by a tube 45 with a conduit for air under pressure which is not shown in the drawing, a slot 46 being provided in the hollow post 3, which slot extends over such a part of the circumference of the post that air under pressure is forced to the jets 44 in positions B to E inclusive.

In the wall of the hollow post 3 is also made an aperture just opposite to the end of a tube 82 provided in the interior of the hollow post 3. This tube serves as an outlet. When the bulb carrier has arrived in position G and the parts of the tubule and of the bulb that have been heated to a high extent are fused together, this fusing operation would be injuriously influenced if an excessive pressure were produced in the bulb owing to the heating to a high temperature of the contained air. In order to obviate this objectionable influence the tube 44 is located in the said position in front of the aperture in question in the hollow post 3 so that the air may find its way out of the bulb carrier through the tube 82.

When the bulb carrier is in position A the operator inserts a bulb in the carrier, which is then in the position shown in dotted lines in Figure 2. The glass tube is placed in the tube holder also in position A. A ledge 105 fixed to the stationary part of the machine ensures that the glass tubes are always placed and held in the tube holders in the same raised position. In moving from position A to B the bulb carrier is raised under the influence of the spring 36 so that the bulb is clamped between the guide 16 and the bushing 22 in the manner before described. During the movement from position A to position B the carrier of the jaws 18 and 19 and of the burner 20 is moved in such a way that the burner 20 is placed above the centre of the bulb.

The driving mechanism of the jaws 18 and 19 and of the burners 20 will be described in detail, reference being especially had to Figures 3, 4 and 5.

A vertical shaft 47 serves for carrying the jaws 18 and 19 and the burner 20. The latter is fastened to it by a support 47ᵃ firmly fixed to the shaft 47.

The jaws 18 and 19 are carried by pivots 48 and 49 of a lever 56, clamped about the shaft 47.

The upright shaft 47 is vertically reciprocatable in a standard 17 which by means of a frame 60 is fixed to the table 6. The shaft 47 is kept in raised position by a spiral spring 62 one end of which rests on a collar of the standard 17 whilst the other end engages a ring 61 firmly fixed to the shaft 47.

The elastic capacity of the spring 62 is so chosen that the latter is just capable of balancing the weight of the shaft 47 with the parts fixed to it so that the shaft remains stationary in any raised position. The difference in elastic force in the various positions in neutralized by the friction of the shaft in its brackets.

The shaft 47 is vertically reciprocatable by means of a toothed rack 64 which meshes with a pinion 63 firmly fixed to the shaft 47.

The toothed rack 64 is firmly fixed to a bolt 65 pivoted in the lower curved end of the standard 17. A sleeve, to which the lever 95 of the handle 96 is fixed is attached to the end of the bolt 65, so that by swinging the handle 96 it is possible to properly position the vertical shaft 47. In positions A to E inclusive this is not possible as a roller 67 at the end of a lever 66, which is also firmly fixed to the bolt 65, is then between the two collars of a cam track 68. The cam track 68 is fixed to the stationary table of the machine by means of columns 69.

A lever 88 carrying at its end a roller 89 is fixed at the lower end of the shaft 47. When the machine is moving from position A to positions B, C, D and E in succession said roller rides upon the edge of the horizontal cam 90.

The lever 85 is integrally connected with the lever 88 and a spring 86, one end of which is fixed to the lever 85 and the other end to a support 87, tends to draw the shaft 47 normally into such a position that the jaws 18 and 19 are just above the bulb, as is the case in positions F, G, H, J and A in Figure 1.

If however the roller 89 rolls upon the cam track 68, the spring 86 is extended and the shaft 47 turns through such an angle that the burner 20 is placed centrally above the bulb. Such is the position of the burner in positions B, C, D and E. In these conditions a mixture of gas and air is delivered to the burner. To that end a feed tube 71 which is attached to a block 72, fixed to the top of the shaft 47, is connected to the burner 20. The tube 71 is connected to a tube 73 which through a rubber tube 74 (Figure 3) is united to a horizontal tube 75, the other end of which is in connection with a sleeve 77 rotatable about a pivot 76 firmly secured to the hollow post 3. The sleeve 77 is driven by the rotation of the table 6, to which it is fixed by a cover 78.

The mixture of gas and air is supplied to the burner 20 through a tube 80, within the hollow post. This tube 80 is connected through a hole 79 in the pivot 76 to a slot 81 which extends over such a part of the circumference of the pivot 76 that a mixture of gas and air is delivered to the tube 75 when the burner is in one of the positions B, C, D or E. The flame of the burner is ignited by some lighting device for example by a small burner 103, when the machine is moving from A to B.

The burner then directs a pointed flame on the central part of the bottom of the bulb thus softening it and in one of the positions C, D, or E a small hole can be blown in the bulb by air under pressure, which is supplied to the interior of the bulb in the manner before described.

By regulating the temperature of the flame and the pressure of the air, the size of said hole and the shape of the bulb around it can be made as desired.

At the moment at which the air under pressure blows the hole, the flame of the burner 20 is generally blown out. Anyhow, the said flame is extinguished after the position E, the tubes 75 being then no longer charged with a supply.

The bulb is then prepared for placing the tubule on it and fusing same to it. The pointed burner 20 can be withdrawn from the center line of the bulb and then the jaws 18 and 19 should be carried above the bulb. This movement is performed between the positions E and F, under the influence of the roller 89 which runs off the cam track 68.

In the next positions of the machine the tubule which in position A is pushed between the jaws is held in the centre line of the bulb.

The jaws 18 and 19 which together grip the tubule, move on the pivots 48 and 49 which are carried by a horizontal arm 56 and form an integral part of two toothed racks 50 and 51 (Figure 5) which engage each other. Firmly connected to the toothed rack 51 is a lever 52 the end of which is provided with a roller 53 and which by a spring 55 is normally drawn into such a position that the jaws 18 and 19 are closed. In order to facilitate the inserting of the tubule in the jaws the latter are provided in front with curved fingers.

In the position F of the machine the lower part of the tubule is preliminarily heated by the burners 101.

In position G the lower end of the tubule and the bulb around the hole are further heated and softened by the burners 102.

A second operator near position G of the machine then lowers the tubule somewhat by operating the handle 96 so that the tubule and the bulb engage each other and are fused together. When the parts have been fused together the operator raises the tubule somewhat by operating the handle 96 so that the tubule is contracted close to the bulb. Finally said operator turns the machine to the next position (from G to H), thus allowing the bulb and the tubule to cool down in positions H and J of the machine. Near the position J the roller 53 rides upon a cam 104 which is connected to the stationary part of the machine. The roller 53 is thereby pushed out of the way and the grip of jaws 18 and 19 is released. As the bulb carrier then moves forward and downward and arrives in position A the tubule is allowed to freely pass between the jaws 18 and 19 so that breaking of this part is prevented. Just after position J the jaws are automatically closed.

The rotatable part of the machine may also be mechanically driven. It will be obvious to those skilled in the art that also the displacement of the tubule for fusing it to the bulb and contracting it can be effected automatically.

What I claim as new and desire to secure by Letters Patent of the United States, is:—

1. In a machine of the character described, the combination with a movable frame, and a plurality of tubulating mechanisms mounted on said frame, each comprising tube holding jaws and a bulb holder movable relatively to each other, and a perforating burner movable into and out of operative relation to a bulb in said bulb holder, of welding burners mounted adjacent to path of said mechanisms to weld a tube in said tube holding jaws to a bulb in said bulb holder, and actuating means mounted adjacent the path of said mechanisms for actuating said bulb holder, said perforating burner, and said jaws of each mechanism in succession during the movement of said frame.

2. In a machine of the character described the combination with a movable frame and a plurality of tubulating mechanisms mounted on said frame, each comprising tube holding jaws and a bulb holder movable relatively to each other, and a perforating burner movable into and out of alignment with said bulb holder, of welding burners mounted adjacent the path of said mechanisms, and stationary cams mounted adjacent the path of said mechanisms to actuate said bulb holder, said perforating burner and said jaws of each mechanism in succession as it is carried along by said frame.

3. In a machine of the character described the combination with a movable frame and a tubulating mechanism mounted on said frame and comprising tube holding jaws, a movable bulb holder, and a perforating burner movable into and out of alignment with said bulb holder, of welding burners mounted adjacent to the path of said mechanism, and stationary cams mounted adjacent to the path of said mechanism to swing said perforating burner into and out of alignment with said bulb holder and to swing said jaws into alignment with said bulb holder in succession.

4. In a machine of the character described a tubulating mechanism comprising a pivoted bulb holder, a pair of tube holding jaws mounted to reciprocate bodily along the longitudinal axis of a bulb in said holder and to swing bodily transversely of said axis, and actuating means for swinging said bulb holder in the plane of the axis of a bulb in said holder and for swinging said tube holding jaws transversely of the axis of the bulb and reciprocating said jaws bodily.

5. In a machine of the character described, the combination with a movable frame and a tubulating mechanism on said frame comprising a tube holder, a tubular bulb holder mounted to swing away from said tube holder to permit insertion of a bulb in said bulb holder, and a perforating burner for heating a restricted area of said bulb, of means actuated in response to movement of said frame for swinging said bulb holder toward and away from said tube holder, and means controlled by said frame for supplying air under pressure to the interior of said bulb holder while said bulb holder is in registry with perforating burner.

6. In a machine of the character described the combination of a movable frame, a tubulating mechanism on said frame comprising a tube holder and a tubular bulb holder having at one end a seat to form a tight joint with a bulb in said holder and closed at the other end, a perforating burner mounted adjacent to said bulb holder to direct a perforating flame upon a circumscribed area of the bulb and normal thereto, and means controlled by said frame for directing the flame of said perforating burner upon said bulb in said holder and for supplying air under pressure to the interior of said holder during a definite portion of the travel of said tubulating mechanism whereby said bulb is perforated.

In witness whereof, I have hereunto set my hand this 10th day of January, 1924.

WILLEM KONING.